(12) United States Patent
Cook et al.

(10) Patent No.: US 6,237,622 B1
(45) Date of Patent: May 29, 2001

(54) FLOW DIVERTER ASSEMBLY (75) Inventors: William D. Cook, Sherman Oaks; Arthur C. Inocelda, Newhall; Robert G. Tice, Canyon Country, all of CA (US)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/519,275

(22) Filed: Mar. 7, 2000

(51) Int. Cl.[7] .................................................. F16K 11/00
(52) U.S. Cl. ........................ 137/270; 137/454.6; 137/597; 137/625.4
(58) Field of Search .................................. 137/269, 270, 137/271, 454.6, 98, 625.4, 597

(56) References Cited

U.S. PATENT DOCUMENTS

| | | | |
|---|---|---|---|
| 3,674,048 | 7/1972 | Manoogian et al. | 137/270 |
| 3,823,737 | 7/1974 | Szymanski | 137/607 |
| 4,397,330 | 8/1983 | Hayman | 137/270 |
| 4,676,270 | 6/1987 | Knapp et al. | 137/270 X |
| 4,804,011 | 2/1989 | Knapp | 137/270 |
| 4,901,749 | 2/1990 | Hutto . | |
| 4,981,156 | 1/1991 | Nicklas et al. | 137/270 |
| 5,095,934 | 3/1992 | Iqbal | 137/270 |
| 5,325,887 | 7/1994 | Egli et al. | 137/270 |
| 5,331,997 | * 7/1994 | Bosio | 137/270 |
| 5,806,552 | 9/1998 | Martin, Jr. | 137/270 |

* cited by examiner

Primary Examiner—Stephen M. Hepperle
(74) Attorney, Agent, or Firm—Edward D. Murpy; John D. DelPonti (57) ABSTRACT

A flow diverter, two position, plate type, assembly connected to a mixing valve always to deliver hot water to the same designated hot water inlet port of the mixing valve and cold water to the same designated cold water inlet port of the mixing valve. The flow diverter assembly including a housing, hot and cold inlet lines to be connected in one or the other of two positions and a plurality of interconnected plate members always to deliver hot and cold water to the same inlet ports of the mixing valve regardless of whether the hot or the cold water inlet lines are connected in one or the other positions. The plate members having a top member connected to the mixing valve, a bottom member selectively connected to the hot and the cold water inlet lines in the one or the other of the two positions and an intermediate member selectively mounted responsive the one position or the other position to which the hot and the cold water inlet lines are connected always to deliver hot and cold water to the same inlet port of the mixing valve.

5 Claims, 6 Drawing Sheets

POSITION 2

FIG. 4B

POSITION 1

FIG. 4A

POSITION 1
FIG. 5A

POSITION 2
FIG. 5B

FLOW DIVERTER ASSEMBLY

FIELD OF THE INVENTION

This invention relates primarily to a flow diverter assembly. More particularly, the present invention relates to a flow diverter assembly for use in regular installations in single bathrooms and showers or in back-to-back installations in multiple bathrooms and showers that share a common wall and common supply plumbing within that wall.

BACKGROUND OF THE INVENTION

Flow diverters of the prior art, especially when used in back-to-back installations, were complex and costly to install, and some could be prone to leak unless installed with great care, especially those that required hydraulic pressure of the water to seal the valve. Adapters could also be used to obtain standard flow patterns and avoid reversal of hot and cold water controls of the control valve involved in the back-to-back installations. The use of adapters required extra parts to be carried in inventory and added to the cost of the installation.

SUMMARY OF THE INVENTION

It is an object of the present invention to overcome the deficiencies of the prior art and to provide a flow diverter that is simple, economical, reliable and easy to install. It is another object of the present invention to provide a flow diverter that is self-contained and may be installed in either one of the two positions for regular and/or back-to-back installation.

It is still another object of the present invention to provide a flow diverter that uses the orientation of plate members sandwiched between a pressure balancer and a mixing valve, typically of the ceramic cartridge type, for regular or back-to-back installation.

It is still another object of the present invention to provide a flow diverter that uses the orientation of an intermediate plate of the plate members to obtain a regular or back-to-back installation of the hot and cold water supplied to the mixing valve, regardless of whether or not the water supply lines have a regular or reversed orientation.

It is still another object of the present invention to provide a flow diverter that always directs the hot water from the water supply line to the same hot water inlet port of the mixing valve and cold water from the cold water supply line to the same cold water inlet port of the mixing valve, regardless of the orientation of the hot water supply line and the cold water supply line delivering the respective hot and cold water to the mixing valve.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

It is conventional to have a mixing valve operate in the same manner for each installation throughout an entire site. This has required that back-to-back installations use a flow diverter of one type or another or some other form of adapter so as to reverse the incoming hot and cold flow patterns when necessary so that hot water from the hot water supply line is always directed to the same hot water inlet port of each of the mixing valves of the installation and, likewise, cold water from the cold water supply line is always directed to the same cold water inlet port of each of the mixing valves of the installation. By way of explanation, when tub and shower or other bathroom mixing valves are installed and share a common wall and common supply plumbing within that wall, it is desirable to plumb the mixing valves in a less complex and less expensive back-to-back configuration. When mixing valves are installed in a back-to-back configuration, one of the mixing valves will be plumbed correctly with the incoming hot water supply line connected to the regular hot water inlet and the incoming cold water supply line connected to the regular cold water inlet. However, the other mixing valve will be plumbed incorrectly with the incoming hot water supply line connected to the cold water inlet and the incoming cold water supply line connected to the hot water inlet. When a mixing valve is plumbed incorrectly in this manner, the direction of rotation to adjust from hot to cold will be reversed from the direction indicated on the mixing valve trim. The principal purpose of the present invention is always to provide the same direction of adjustment of the mixing valve's operation for both regular and/or back-to-back installation so as to never require any replumbing of the installation. All that will ever need to be done is simply to reverse the flow pattern of the incoming hot and the cold water when necessary for some of the back-to-back installations by reorientating the flow pattern through the plate members so that the hot water is always delivered to the same hot water inlet port of the mixing valve of each installation and the cold water is always delivered to the same cold water inlet port of the mixing valve of each installation.

Figures 1A, 1B:
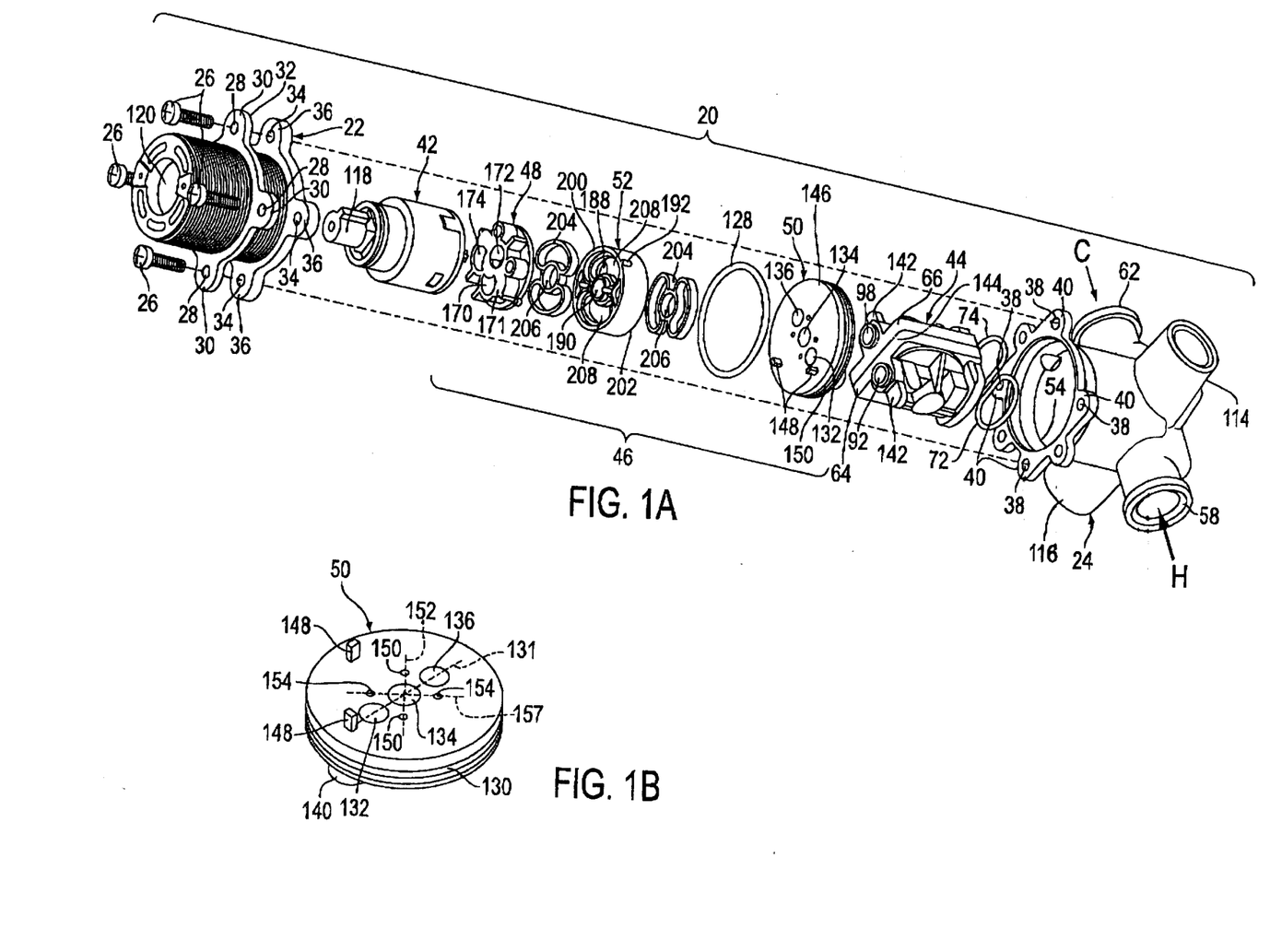
FIG. 1A is an exploded perspective drawing of the preferred embodiment of the present invention.
FIG. 1B is an enlarged perspective view of the bottom member of the plate members shown in FIG. 1A.
Figure 2:
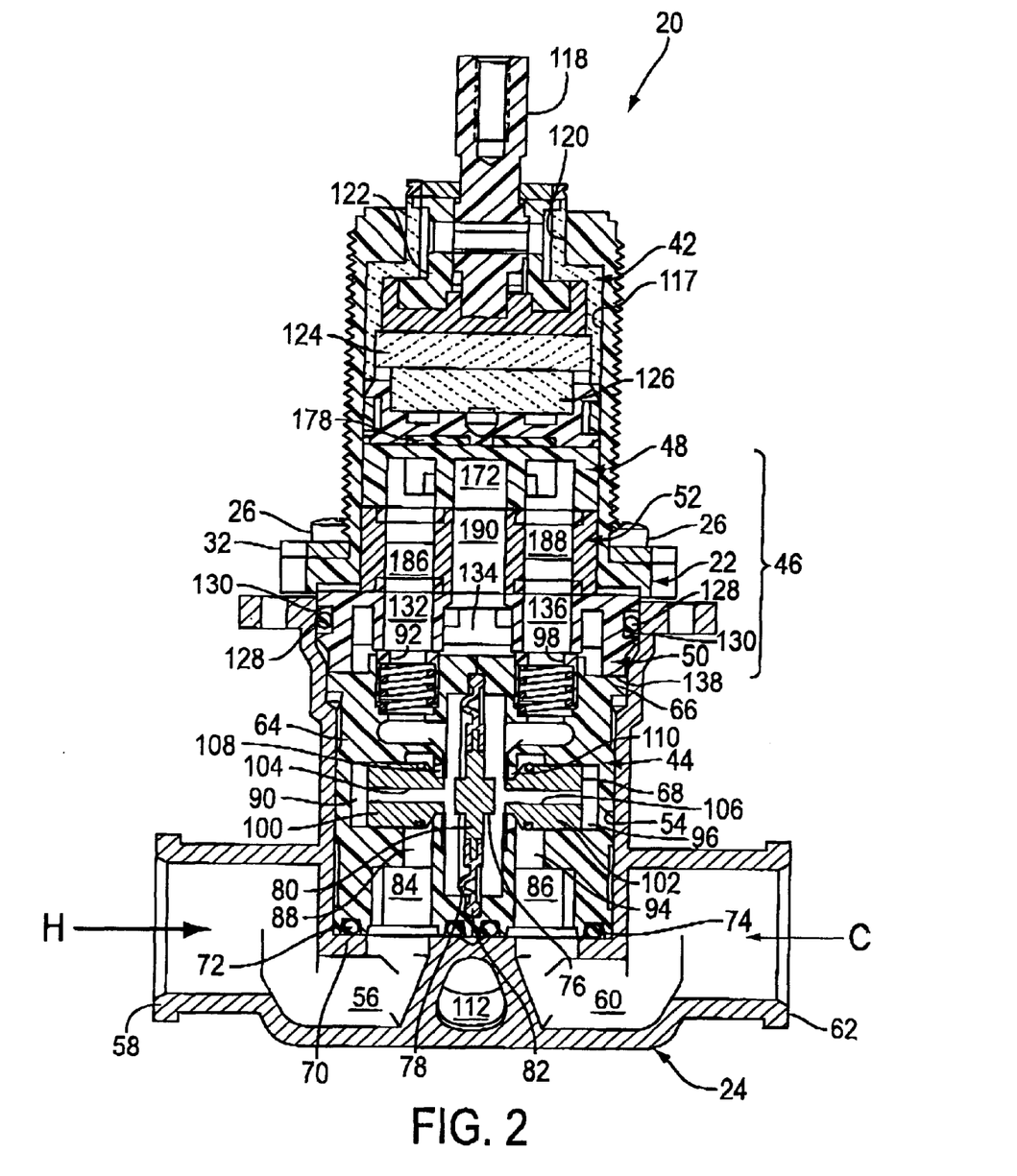
FIG. 2 is a side sectional elevational view of the preferred embodiment of the present invention shown in FIG. 1.

Referring now to the drawings, in which like reference numerals designate like or corresponding parts throughout the several views, there is shown in FIGS. 1A and 2, a valve assembly 20 for a bathroom, tub or shower installation in accordance with the preferred embodiment of the present invention. The valve assembly 20 includes the external components of a bonnet 22 sealingly connected to a casting 24 by four screws 26, each of which pass through openings 28 in the ears 30 of a retainer 32 which are aligned with openings 34 of ears 36 of the bonnet 22 and threaded openings 38 of ears 40 of the casting 24 to form a tight connection therebetween. The internal components of the valve assembly 20 are sealingly mounted within the interconnected bonnet 22 and casting 24 and include a mixing or control valve 42 which is typically a ceramic cartridge valve mounted in the bonnet 22 and a pressure balancer 44 mounted in the casting 24. Sandwiched therebetween are three plate members 46 that are made up of a top member 48, a bottom member 50 and an intermediate member 52, the purpose and description of each of the members will be set forth in greater detail hereinafter.

Referring now to FIG. 2, the valve assembly 20 comprises the casting 24 into which is mounted the pressure balancer 44, the three plate members 46 and the bonnet 22 into which is mounted the mixing valve 42. The pressure balancer 44 is mounted within a chamber 54 of the casting 24 that is in communication with water supply ports 56 that is a continuation of water supply line 58 shown on the left side of FIGS. 1A and 2 and which corresponds to Position 1 of the plate members 46 depicted in FIG. 3 that will be connected to a source of hot water (not shown). On the right side of FIGS. 1A and 2 is a water supply port 60 that is a continuation of water supply line 62 which corresponds to Position 1 of FIG. 3 and will be connected to a source of cold water (not shown). Pressure balancer 44 is comprised of a first plastic section 64, a second plastic section 66 and a poppet assembly 68. Pressure balancer 44 is seated against a shoulder 70 formed by casting 24 within chamber 54. A pair of seals 72 and 74 seal the connection between hot water port 56 (Position 1 of FIG. 3) and section 64 of the pressure balancer 44, and cold water port 60 (Position 1 of FIG. 3) and section 66 of the pressure balancer 44. A poppet assembly 68 is disposed within a chamber formed by section 64 and 66. The poppet assembly 68 comprises a one-piece poppet unit 76 and a diaphragm 78. The poppet unit 76 is attached to the diaphragm 78 by over molding the diaphragm 78 to an annular shoulder 80 formed on the poppet unit 76.

Figure 3:
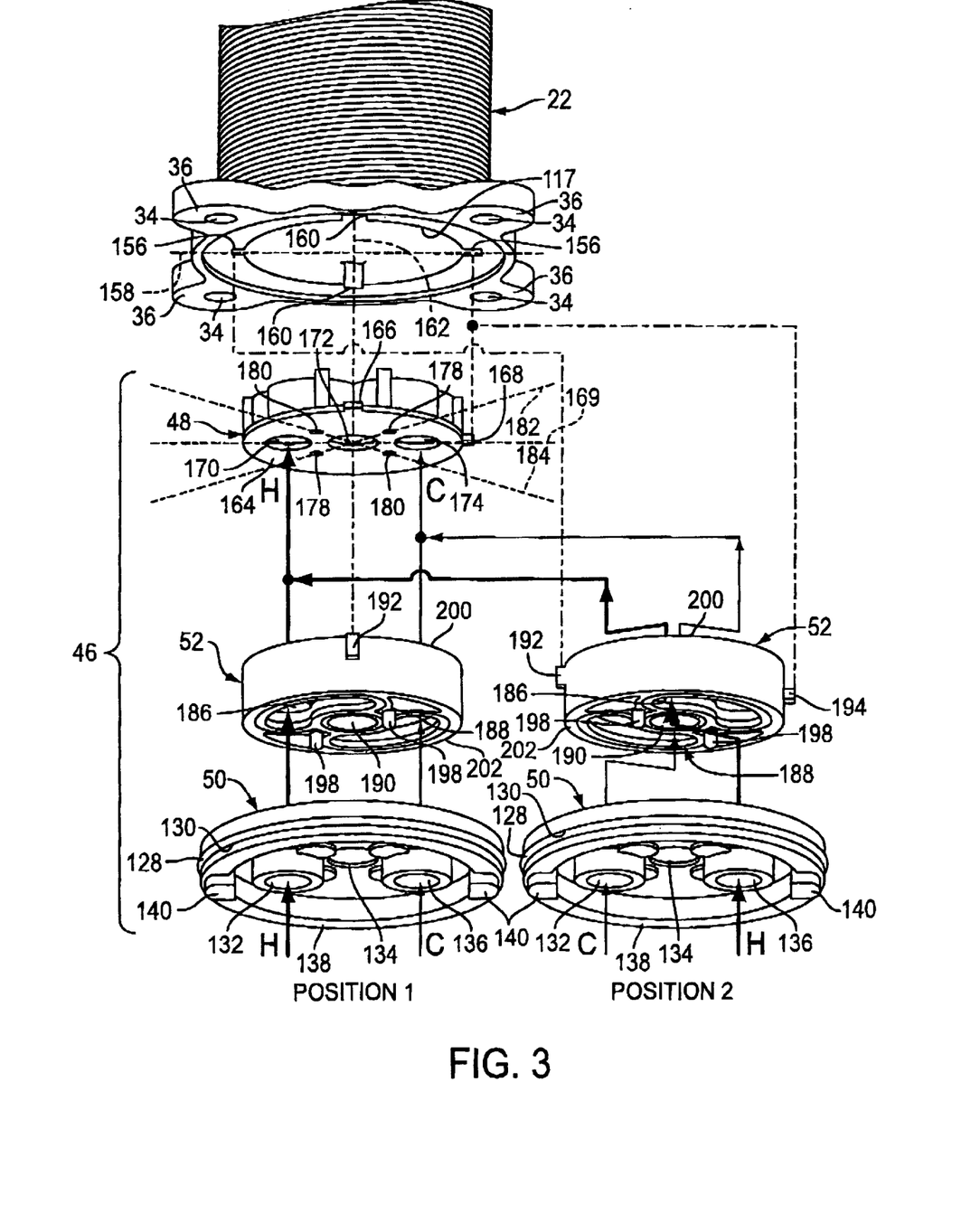
FIG. 3 is a fragmented exploded view depicting the two positions of the plate members in which Position 1 shows a regular flow pattern of the incoming hot (H) and cold (C) water and Position 2 shows a reversal of the flow pattern of the incoming hot (H) and cold (C) water.

Diaphragm 78 includes an annular bead 82 which is sandwiched between sections 64 and 66 to provide a fluid tight connection separating the chamber defined by sections 64 and 66 into a hot water chamber 84 and a cold water chamber 86 which corresponds to the flow pattern illustrated in Position 1 of FIG. 3. It will be understood that in Position 2 of FIG. 3 there is a reversal of the incoming hot and cold water but, except for this change, the pressure balancer 44 will continue to function the same. Hot water chamber 84 includes an input portion 88 which is in communication with hot water port 56, central portion 90 and an outlet portion 92. Cold water chamber 86 includes an input portion 94, a central portion 96 and an outlet portion 98. Poppet unit 76 includes a hot water poppet 100 disposed within central portion 90 and a cold water poppet 102 disposed within central portion 96. Poppets 100 and 102 are integral with the central portion of poppet unit 76 that mounts diaphragm 78. A bore 104 extends radially and axially through poppet 100 to allow hot water to flow from behind poppet 100 and section 64. Likewise, a bore 106 extends radially and axially through poppet 102 to allow cold water to flow from behind poppet 102 and section 66. Poppet 100 controls the fluid flow of hot water by opening and closing a hot water port 108 located within central portion 90 and poppet 102 controls the fluid flow of cold water by opening and closing a cold water port 110 located within central portion 96.

When hot water pressure and cold water pressure are equal, diaphragm 78 is centrally positioned between chambers 84 and 86 allowing an equal amount of hot water and cold water to flow through pressure balancer 44. Corresponding to Position 1 of FIG. 3, hot water is supplied through hot water port 56 into portion 88, through central portion 90 and port 108, and finally out outlet portion 92. In a similar manner, cold water is supplied through cold water port 62 into input portion 94, through central portion 96 and port 110, and out outlet portion 98. Should the hot water pressure decrease, poppet assembly 68 is urged to the left of the position shown in FIG. 2 or toward hot water chamber 84. This movement reduces the opening of cold water port 110 and increases the opening of hot water port 108 thereby maintaining the ratio of hot and cold water to stabilize the temperature of the mixed water being supplied to the mixing valve 42. In a similar manner, should the cold water pressure decrease, poppet assembly 68 is urged to the right of the position shown in FIG. 2, or toward cold water chamber 86. This movement reduces the opening of hot water port 108 and increases the opening of cold water port 110 thereby maintaining the ratio of the flow of hot and cold water to stabilize the temperature of the mixed water being supplied to the mixing valve 42. The details and function of pressure balancer 44 are described in more detail in assignees U.S. Pat. No. 5,501,244, the disclosure of which is hereby incorporated herein by reference.

As stated earlier, the casting 24, shown in FIGS. 1A and 2, corresponds to Position 1 of FIG. 3 in that hot water is supplied to the water supply port 58 illustrated on the left side of the figures and cold water is supplied to the water supply port 62 illustrated on the right side of the figures. Also, the water discharge from the mixing valve 42 will be delivered to discharge chamber 112 shown only in FIG. 2 from which it will be discharged as shown in FIG. 1A, either through discharge outlet 114 for flow to a tub (not shown) or through discharge outlet 116 for flow to a shower (not shown). Suitable valving (not shown) will selectively control the discharge flow and direct it to either the tub or shower.

The bonnet 22 is formed with a chamber 117 in which is mounted the mixing valve 42. The mixing valve 42 in the preferred embodiment is a single control type that adjusts both flow volume and temperature, but of course any other type of mixing valve could be used. The flow volume is controlled by raising or lowering a control stem 118 shown in FIGS. 1A and 2 that projects outwardly of a top opening 120 formed in a chamber 117 of the bonnet 22 in which the mixing valve 42 is mounted. Upon raising the control stem 118 the flow volume will be increased and on lowering the control stem 118 the flow volume will be decreased. The lowest position of the control stem 118 will shut off the flow, while the highest position of the control stem 118 will provide a maximum flow volume. If desired, the water temperature may be preset within a range of temperatures by a suitable device (not shown) so as to ensure that the water temperature will remain within conventional levels. The water temperature is controlled by rotation of the control stem 118 either clockwise or counterclockwise. In the present instance, the convention described will be counterclockwise rotation controls the hot water and clockwise controls the cold water. Accordingly, turning the control stem 118 counterclockwise will increase the water temperature and make it hotter, while turning the control stem 118 clockwise will decrease the water temperature and make it colder. The hottest water temperature is reached by turning the control stem 118 to its furthest point in the counterclockwise direction, and the coldest water temperature is reached by turning the control stem 118 to its furthest point in the clockwise direction. Lastly, the control stem 118 acts as a water temperature memory so that whenever the water volume is turned off and on with the control stem 118 in the same rotational position the water temperature for that rotational position is maintained.

The mixing valve 42 is of conventional construction and, as shown only in FIG. 2, the control stem 118 is connected through a coupler 122 to a movable ceramic disc 124 operatively positioned in engagement with a fixed ceramic disc 126 to control and mix the flow in a well known and conventional manner. Hot water and cold water respectively are separately delivered to the mixing valve 42 through separate inlet ports (not shown) and a suitable adjustable mixing chamber (not shown) is provided within the discs 124 and 126. Also provided is an outlet port (not shown) for the discharge of the mixed hot and cold water from the mixing valve 42 through the respective discharge openings formed in the plate members 46, to chamber 54 externally of the pressure balancer 44 and finally to the discharge chamber 112 from which it will be delivered to the tub or shower as described hereinbefore. A more detailed understanding of the mixing valve 42 and its functions are described in assignee's U.S. Pat. Nos. 5,329,957 and 5,402,827, the disclosures of which are hereby incorporated herein by reference.

The three plate members 46 are shown in FIGS. 1A, 1B, 2 and 3 and are sealingly interconnected to each other and, as described hereinbefore, the bottom member 50 is mounted in the chamber 54 of the casting 24, as best shown in FIG. 2. An O-ring gasket 128 is disposed in an annular recess 130 formed in the circular outer circumference of the bottom member 50 to seal its mounting within the chamber 54 of the casting 24. The bottom member 50 is disc­shaped and has three openings that lie along a hypothetical line 131 and extend therethrough. Formed along the hypothetical line 131, the bottom member 50, as shown in FIGS. 1A, 1B, 2 and 3, has an opening 132 that is formed on the left side, a central discharge opening 134 and an opening 136 that is formed on the right side. The lower end 138 of the bottom member 50 has a pair of diametrically opposed tabs 140, 140 which nest onto a pair of diametrically opposed tabs 142, 142, best shown in FIG. 1B, is formed on the upper end 144 of the pressure balancer 44. The outlet portion 92 of the pressure balancer 44 sealingly mates with the flat bottom of the opening 132, while the outlet portion 98 of the pressure balancer 44 sealingly mates with the flat bottom of the opening 136. This provides inlet passages through openings 132 and 136 which, as shown in Position 1 of FIG. 3, that will respectively supply hot water to opening 132 of the bottom member 50 and cold water to opening 136 of the bottom member 50. It is noted that hot water is depicted in FIGS. 1A, 2 and 3 by the heavy line arrows designated H and that cold water is depicted in these figures by the regular line arrows designated C.

The central opening 134 of the bottom members 50 receives the discharge flow which is then discharged to pass about the closed outside of the pressure balancer 44 (see FIGS. 1A, 1B and 2) to be delivered to the discharge chamber 112 from which it is discharged from the valve assembly 20 through one of the outlets 114 and/or 116 thereof, as described hereinbefore. The upper end 146 of the bottom member 50, best shown in FIG. 1B, has a flat surface from which two location pins 148, 148 project upwardly a short distance to be suitably disposed (not shown) in the intermediate member 52 to aid in a proper orientation therebetween. Also, two pairs of recesses are formed about the central opening 134 with one pair of recesses 150, 150 formed on either side of a 45° dotted diagonal line 152 that increases upwardly from the horizontal on the right side and the second pair of recesses 154, 154 that is formed on either side of a 45° dotted diagonal line 157 that increases upwardly from the horizontal on the left side. The pairs of recesses 150, 150 and 154, 154 are disposed at the corners of a hypothetical square which has the central opening 134 at its center. As will be described in greater detail hereinafter, the recesses 154, 154 will be used to properly orientate the intermediate member 52, as shown in Position 1 of FIG. 3, while the recesses 150, 150 will be used to properly orientate the intermediate member 52, as shown in Position 2 of FIG. 3.

The bonnet 22, as shown only in FIG. 3, has formed in the chamber 117 a pair of vertical recesses 156, 156 disposed on opposite sides above an X-plane, represented by a dotted line 158 shown at the lower end of the bonnet 22, and a pair of vertical recesses 160, 160 disposed on opposite sides along a Y-plane, represented by a dotted line 162 shown at the lower end of the bonnet 22. The top member 48 is disc-shaped and formed with a smaller diameter than that of the bottom member 50. The top member 48, as shown best in FIG. 3, has a flat lower end 164 from which a small radial outward projection 166 extends from its front side and a small radial outward projection 168 that extends from its right side that is formed at a 90° angle to the front projection 166. Upon the top member 48 being mounted in the chamber 117, the projection 166 will be disposed in the front-most recess 160 of the bonnet 22 and the projection 168 will be disposed in the right-most recess 156 to orientate the top member 48 in the chamber 117. The top member 48, as best shown in FIG. 3, has three openings that lie along a hypothetical line 169 and extend therethrough in a serpen­tine manner to exit in a flat upper end 171 of the top member 48 (see FIG. 1A). Also, the three openings lying along the hypothetical line 131 of the bottom member 50 and the three openings lying along the hypothetical line 169 of the top member 48 are in axial alignment with its respective adja­cent opening and the hypothetical lines 131 and 169 are parallel to each other and to the hypothetical line 158 and each lies in the X-plane formed along the hypothetical line 169. The top member 48, as shown in FIG. 3, has a hot water opening 170 that is formed on the left side, a central opening 172 for discharge flow and a cold water opening 174 that is formed on the right side. Each of the openings follow the serpentine passages through the top member 48 to exit into the flat upper end 171 (shown best in FIG. 1A) so that hot water opening 170 communicates with a hot water inlet port (not shown) of the mixing valve 42, cold water opening 174 communicates with a cold water inlet port (not shown) of the mixing valve 42 and the discharge opening 172 communi­cates with a discharge port (not shown) of the mixing valve 42. All of the water flow connections between top member 48 and the mixing valve 42 are suitably sealed, as by gaskets (not shown). The flat lower end 164 of the top member 48 has a hypothetical square formed about the central opening 172 of the same size and orientation as the hypothetical square of the bottom member 50 and will be in superposition thereto. The hypothetical square of the lower end 164 of the top member 48 has upwardly extending pairs of recesses 178, 178 and 180, 180 formed at the corners of the square, as best shown in FIG. 3. One pair of recesses 178, 178 are formed on opposite sides of the central opening 172 along a 45° dotted diagonal line 182 that increases upwardly from the horizontal on the left side thereof and the other pair of recesses 180, 180 are formed on the opposite side of the central opening 172 along a 45° dotted diagonal line 184 that increases upwardly from the horizontal on the right side thereof.

The intermediate member 52 is sealingly mounted between the top member 48 and the bottom member 50 and is disposed substantially solely in the chamber 117 of the bonnet 22. The intermediate member 52 has three openings that extend through the member 52, which openings are each formed along a hypothetical horizontal line 179 that, in Position 1 of FIG. 3, lies parallel to the hypothetical lines 131, 158 and 169 and in the X-plane, while in Position 2 of FIG. 3 it will lie parallel to hypothetical line 162 and in the Y-plane. When the intermediate member 52 is orientated in Position 1 of FIG. 3 and, as shown in FIGS. 1A, 2 and 3, an opening 186 formed on the left side is in axial alignment with the opening 132 of the bottom member 50 and the opening 170 of the top member 48 so that hot water originating in supply line 58 will pass through the pressure balancer 44, to pass through the openings 132, 186 and 170 of the plate members 46, as indicated by the heavy line arrows designated H, to be delivered to the hot water inlet port of the mixing valve 42. The intermediate member has an opening 188 formed on the right side that, in Position 1 of FIG. 3, is in axial alignment with the opening 136 of the bottom member 50 and the opening 174 of top member 48 so that cold water originating in supply line 62 will pass through the pressure balancer 44, to pass through the openings 136, 188 and 174 of the plate members 46, as indicated by the regular line arrows designated C, to be delivered to the cold water inlet port of the mixing valve 42. The flow of the discharge port of the mixing valve 42 is the same for both Positions 1 of FIG. 3 and Position 2 of FIG. 3, in that the flow will pass downwardly through the central opening 172 of the top member, the central opening 190 of the intermediate member 52 and the central opening 134 of the bottom member 50. It will be understood that the respective pairs of openings in the bottom member 50 and the top member 48 are, and remain, in axial alignment for both Position 1 of FIG. 3 and Position 2 shown in FIG. 3. Also, as stated earlier, the three openings 186, 188 and 190 of the intermediate member 52 lie along the hypothetical line 179.

The intermediate member 52 illustrated in FIGS. 1 through 8 is substantially disc-shaped and sized with a diameter equal to that of the top member 48. A short vertical front projection 192 extends from the mid-point to the top and radially outwardly from the outer circumference. Proper orientation of the intermediate member 52 is maintained by projection 192 always being placed in the upper position. A second short rear outwardly projection 194 extends from the midpoint of the opposite side of the outer circumference 180° from projection 192. In Position 1 of FIGS. 3, 4A and 5A, the projections 192, 194 lie on a line parallel to the line parallel to the hypothetical line 162 so that, on assembling the intermediate member 52 in the chamber 117 of the bonnet 22, the projection 192 will enter the front recess 160 and the rear projection 194 will enter the rear recess 160.

Figure 5A:
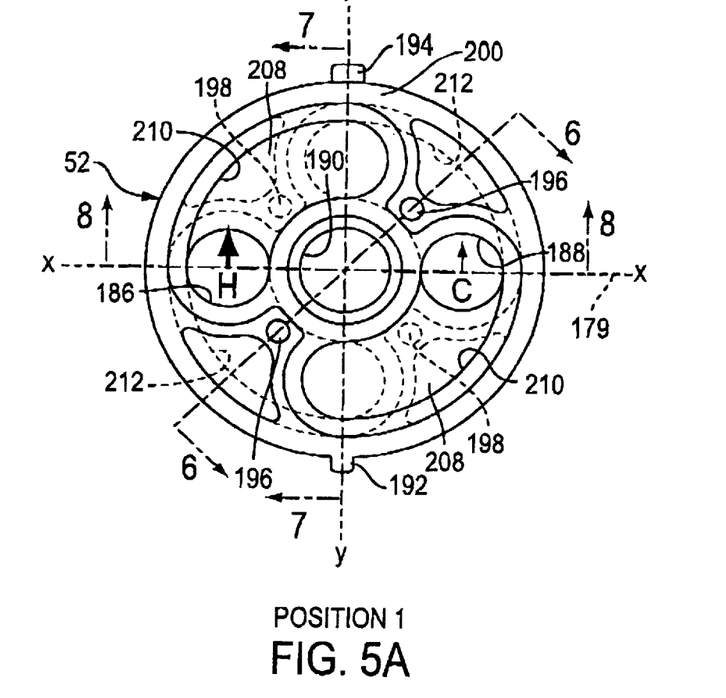
FIG. 5A is a plan view of the intermediate member of the plate members corresponding to the Position 1 shown in FIG. 3.
Figure 6:
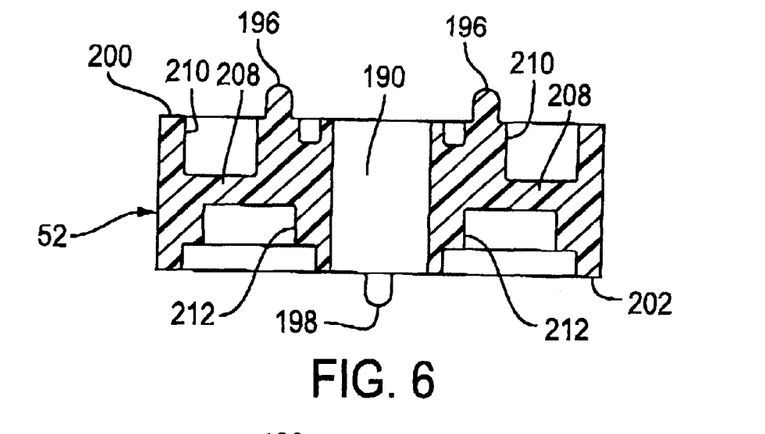
FIG. 6 is a view taken along line 6—6 of FIG. 5A.
Figure 7:
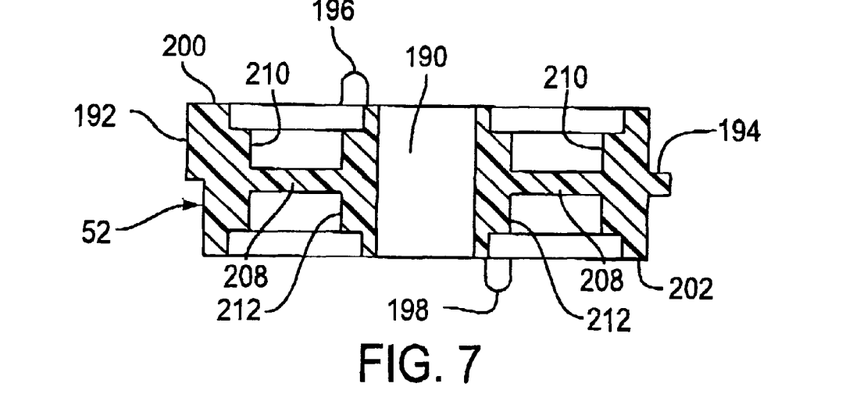
FIG. 7 is a view taken along line 7—7 of FIG. 5A.

As best shown in FIGS. 5A (Position 1), the intermediate member 152 has a top pair of short upward projections 196, 196 which lie along the sectional line 6—6 that is parallel to the dotted diagonal line 182 of the top member 48. A second pair of short downwardly extending projections 198, 198 that are shown dotted and lie parallel to the dotted diagonal line 154 (see FIG. 1B) of the bottom member 50. The projections 196, 196 and 198, 198 of the intermediate member 52 define corners of a hypothetical square of identical size and corner location as the respective squares formed by the recesses 178, 178 and 180, 180 of the top member 48 and the recesses 150, 150 and 154, 154 of the bottom member 50.

Figure 4A:
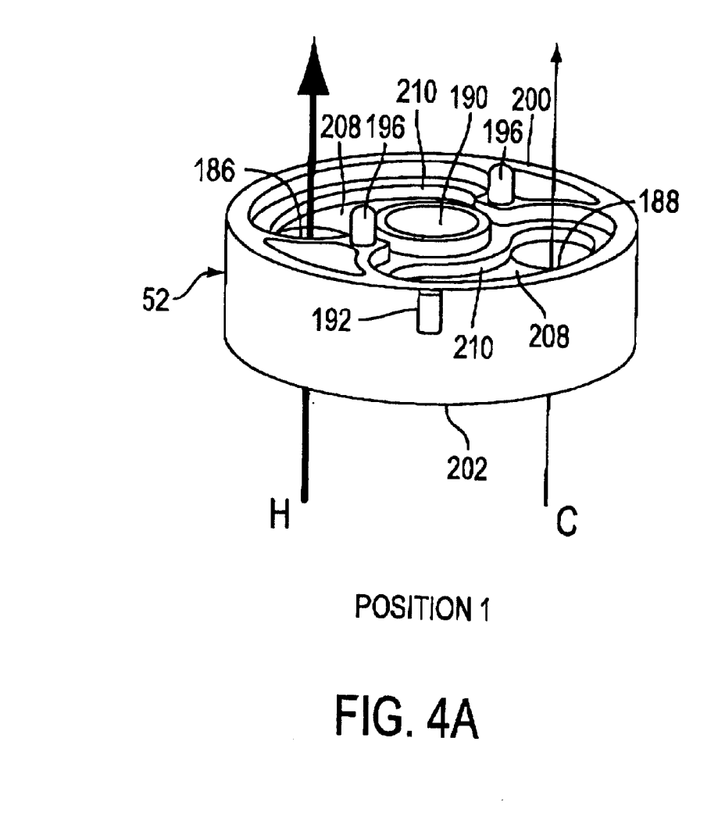
FIG. 4A is a perspective view of the intermediate member of the plate members corresponding to the Position 1 shown in FIG. 3.

In Position 1 of FIG. 3 and FIGS. 4A and 5A, the projections 196, 196 of the intermediate member 52 will be disposed in the recesses 178, 178 of the top member 48, and the projections 198, 198 of the intermediate member 52 will be disposed in the recesses 154, 154 of the bottom member 50. As stated earlier, the projections 192 and 194 of the intermediate member 52 will be disposed in the recesses 160,160 of the bonnet 22.

Accordingly, as shown in Position 1 of FIG. 3 and FIGS. 4A and 5A, the intermediate member 52 is orientated to have the opening 186 in direct communication with the opening 132 of the bottom member 50 and the opening 170 of the top member 48, and the opening 188 in direct communication with the opening 136 of the bottom member 50 and the opening 174 of the top member 48. The hot water passes, as indicated by the heavy line arrow H shown in FIGS. 4A and 5A, vertically upwardly through the opening 186. Likewise, the cold water passes, as indicated by the regular line arrow C shown in FIGS. 4A and 5A, vertically upwardly through the opening 188. As stated hereinbefore, this orientation is assured by projection 192 engaging front recess 160 of the bonnet 22 and projection 194 engaging rear recess 160 of the bonnet 22; the top projections 196, 196 of the intermediate member 52 are disposed in recesses 180, 180 of the top member 48 and bottom projections 198, 198 are disposed in recessed 154, 154 of the bottom member 50.

Figure 5B:
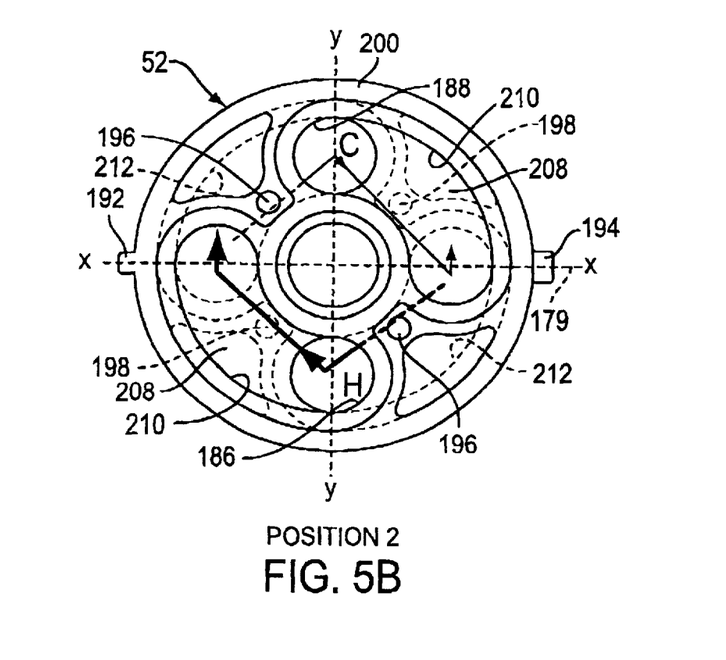
FIG. 5B is a plan view of the intermediate member of the plate members corresponding to Position 2 shown in FIG. 3.
Figure 8:
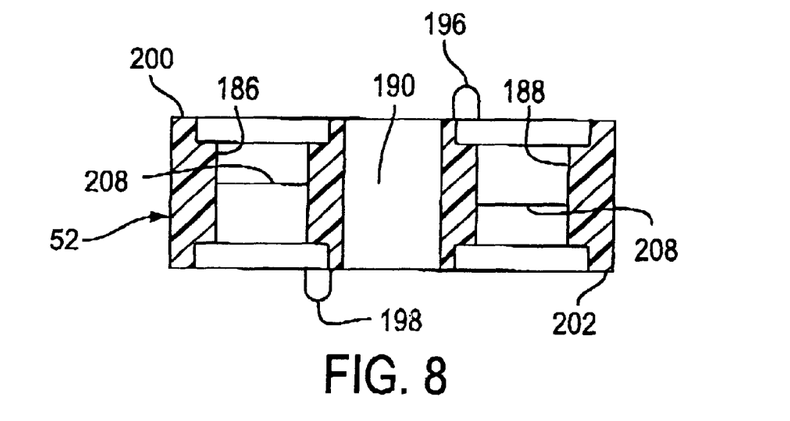
FIG. 8 is a view taken along line 8—8 of FIG. 5A.

The intermediate member 52 has the central opening 190 extend from the top 200 to the bottom 202 thereof and it remains in line with the respective openings 172 and 134 of the top member 48 and the bottom member 50. The contact of the various openings of the respective members 48, 50 and 52 of the plate members is sealed by double oval gaskets 204, 204 which are positioned on either side of the intermediate member 52, as best shown in FIG. 1A. The gaskets 204 have a central opening 206 surrounding the top and bottom of the central opening 190 of the intermediate member 52. Looking at FIG. 7, there is an annular dividing wall 208 formed about the central opening 190 at the middle of the member between the top 200 and the bottom 202 of the intermediate member 52. The openings 186 and 188 of the intermediate member 52 extend through the dividing wall 208, as shown in FIGS. 5A, 5B and 8. A pair of upper channels 210, 210, shown best in FIGS. 5A and 5B as viewed from above, runs clockwise above the dividing wall 208 from the openings 186, 188 to extend about 90° to terminate inwardly of and adjacent to the respective projections 194 and 192. A pair of lower channels 212, 212, shown best in FIGS. 5A and 5B as viewed from above, runs counterclockwise below the dividing wall 208 from the openings 186, 188 to extend about 90° to terminate inwardly of and adjacent to the respective projections 192 and 194.

Figure 4B:
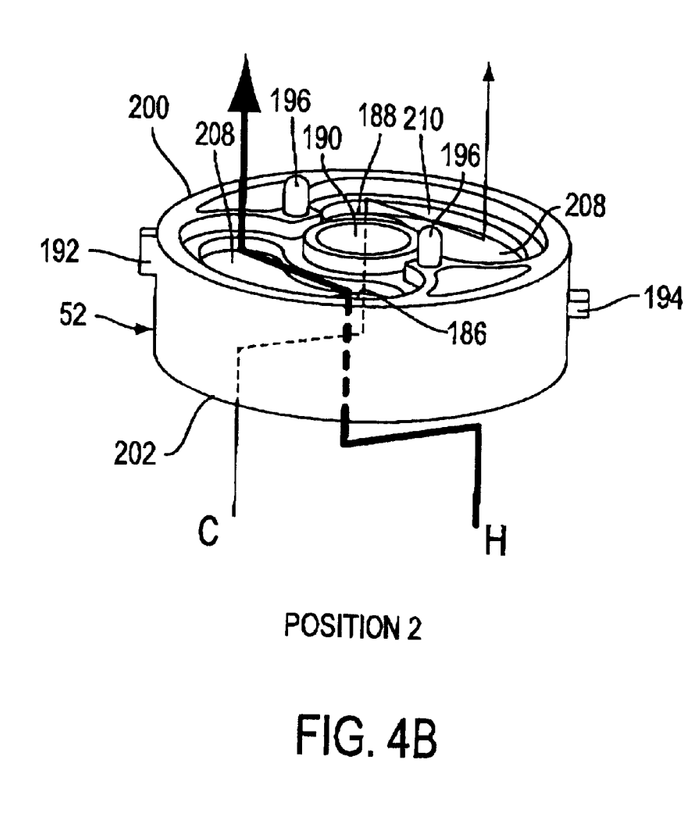
FIG. 4B is a perspective view of the intermediate member of the plate members corresponding to the Position 2 shown in FIG. 3.

Whenever supply line 58 is connected to receive cold water (not shown) and supply line 62 is connected to receive hot water (not shown), it is necessary to orientate the intermediate member 52, as shown in Position 2 of FIG. 3 and FIGS. 4B and 5B. Accordingly, the intermediate member 52 is orientated to place the openings 186 and 188 parallel to the hypothetical line 162 and in the Y-plane. The projections 192 and 194 are parallel to the hypothetical line 158 and are disposed in the recesses 156, 156 of the bonnet 22, with projection 192 engaging the left recess 156 and projection 194 engaging the right recess 156. The top projections 196, 196 of the intermediate member 52 are disposed in recesses 178, 178 of the top member 48 and the bottom projections 198, 198 are disposed in recesses 150, 150 of the bottom member 50. This places the closed end of each bottom channel 212, 212 in communication with the respective openings 132 (cold water) and 136 (hot water) of the bottom member 50. The cold water travels, as shown best in FIGS. 4B and 5B as viewed from above, clockwise in the bottom channel 212 and vertically upward through the opening 186 of the intermediate member 52 to continue its travel in a clockwise direction in the upper channel 210 of the intermediate member 52 to the end of the upper channel 210 to be delivered to the opening 174 of the top member 48 from which it goes to the cold water inlet port of the mixing valve 42. In the cold water going from the opening 132 of the bottom member 50 to the opening 174 of the top member 48, it has traveled 180° in the intermediate member 52 and effectively reversed itself to negate the 180° switch of the water supply line from hot (Position 1 of FIG. 3) to cold (Position 2 of FIG. 3). Likewise, the hot water travels 180° in the intermediate member 52 to effectively reverse its direction of flow going from the opening 136 of the bottom member 50 to the opening 170 of the top member 48. This occurs by the cold water indicated by the regular line arrow C shown in FIGS. 4B and 5B to travel in the intermediate member 52 as described above, and the hot indicated by the heavy line arrow H shown in FIGS. 4B and 5B to travel in intermediate member 52 also described above. Thus, the mixing valve 42 can always receive the hot and cold water in the same respective hot inlet port and cold inlet port whether the installation is regular (Position 1) or back-to-back (Position 2).

While a preferred embodiment has been described above, it will be readily apparent to those skilled in the art that many modifications, substitutions and alternatives may be made without departing from the spirit and scope of the present invention. Therefore, it is intended that the scope of the present invention should not be limited by the description of the preferred embodiment, but only by the claims that follow.

What is claimed is:

1. A flow diverter assembly connected to a mixing valve always to deliver hot water to the same designated hot water inlet port of the mixing valve and cold water to the same designated cold water inlet port of the mixing valve, the flow diverter assembly comprising:
   a. a housing;
   b. a hot water inlet line connected in one of two positions;
   c. a cold water inlet line connected in the other of the two positions;
   d. a plurality of interconnected plate members sealingly mounted in the housing with interconnected passages to separately deliver the hot and cold water to the mixing valve;
   e. the plate members having a top member, a bottom member and an intermediate member;
   f. the top member engaged with the mixing valve;
   g. the bottom member selectively connected to the hot and cold water inlet lines in the one or the other of the two positions; and
   h. the intermediate member selectively mounted responsive to the one position or the other position to which the hot and cold water inlet lines are connected always to deliver hot and cold water to the same inlet port of the mixing valve.

2. The combination claimed in claim 1 wherein:
   a. location means to orient the intermediate member of the plate members in the housing in the one position or the other position whereby hot water and cold water will always be delivered to the same inlet ports of the mixing valve.

3. The combination claimed in claim 2 wherein:
   a. the intermediate member and the top member having a pair of through openings, one for hot water and one for cold water;
   b. the bottom member having a pair of openings selectively to receive hot water or cold water therein; and
   c. pairs of channels formed in the intermediate member on either side of each of the through openings therein to communicate the through openings over a range of 90° and 180° with the bottom member and the top member of the plate members whereby hot water in one passage and cold water in the other passage will continue to be delivered to the same inlet ports of the mixing valve in both the one position and the other position of the hot and cold water inlet lines.

4. The combination claimed in claim 3 wherein:
   a. the one position and the other position lie in substantially the same plane;
   b. the hot water inlet line and the cold water inlet line are reversibly positioned in one position or the other position in substantially the same plane; and
   c. the through openings in the plate members will be substantially in line in the one position and the intermediate member and the top member will each be displaced about 90° in the other position.

5. A valve assembly having a valve cartridge to receive water from a first inlet and a second inlet that is selectively connected in a first position or a second position, and to discharge the water therefrom to an outlet, the valve assembly comprising:
   a. a housing;
   b. a plurality of plate members sealingly interconnected to each other in the housing;
   c. the plate members having a top member, a bottom member and an intermediate member;
   d. each of the plate members having interconnected openings respectively in communication with the first inlet and the second inlet;
   e. the intermediate member having a pair of bottom channels formed therein to extend from each of the openings thereof, and a pair of top channels formed therein to extend from each of the openings thereof;
   f. the bottom channels are formed adjacent the bottom member and the top channels are formed adjacent the top member, with the bottom channels and the top channels formed on opposite sides of the intermediate member;
   g. each of the bottom channels extend in the opposite direction from that of the top channels, with the openings formed at one end of the channels as an interconnection therebetween; and
   h. location means to orientate the plate members in the housing in the first position whereby the openings in the plate members are in substantially direct communication, or in the second position to shift the intermediate member about 90° in orientation and the openings in the plate members about 180° through the use of the bottom and the top channels of the intermediate member.

* * * * *